(No Model.)

T. A. DAVIES.
MEANS FOR SECURING FISH PLATES TO RAILROAD RAILS.

No. 320,638. Patented June 23, 1885.

WITNESSES:
Chas. Nida
C. Sedgwick

INVENTOR:
T. A. Davies
BY
ATTORNEYS.

UNITED STATES PATENT OFFICE.

THOMAS A. DAVIES, OF NEW YORK, N. Y.

MEANS FOR SECURING FISH-PLATES TO RAILROAD-RAILS.

SPECIFICATION forming part of Letters Patent No. 320,638, dated June 23, 1885.

Application filed October 17, 1884. (No model.)

*To all whom it may concern:*

Be it known that I, THOMAS A. DAVIES, a citizen of the United States, residing at New York, in the county of New York and State of New York, have invented certain new and useful Improvements in Securing Fish-Plates to Railroad-Rails, of which the following is a description.

Figure 1:
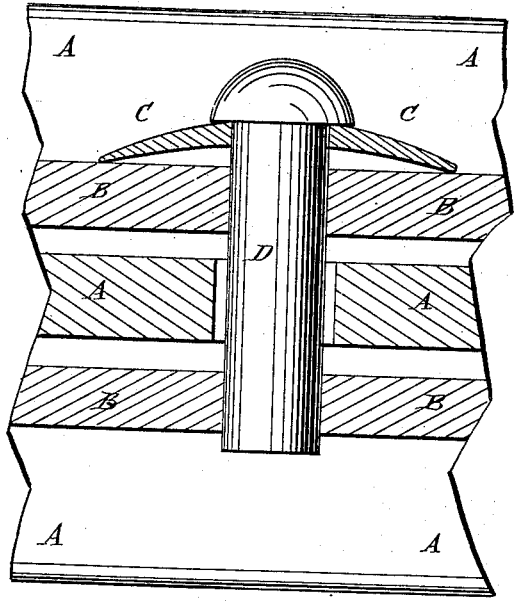
Figure 2:
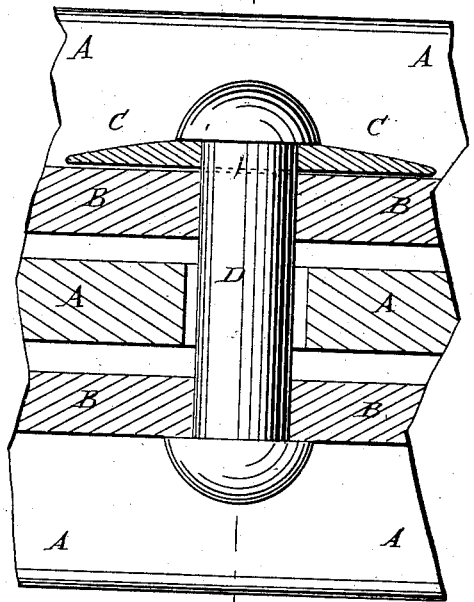
Figure 4:
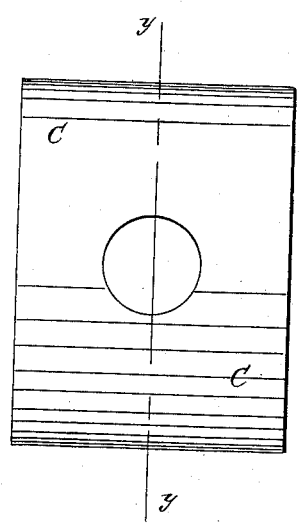
Figure 3:
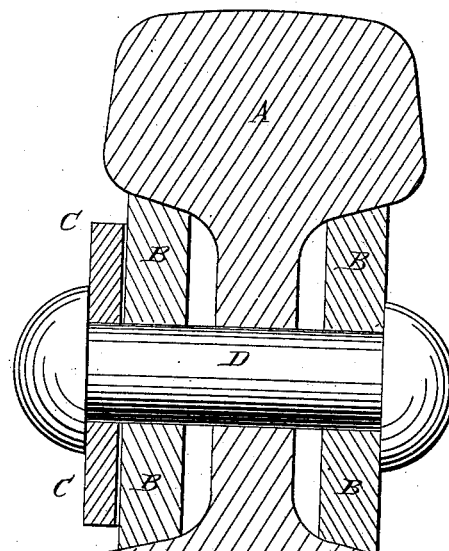
Figure 5:

Figure 1 is a sectional plan view of a railroad-rail and its fish-plates and washer, and showing the bolt or rivet inserted, but not riveted. Fig. 2 is the same section as Fig. 1, but showing the bolt riveted. Fig. 3 is a sectional end elevation of the same, taken through the line $x\,x$, Fig. 2. Fig. 4 is an elevation of the washer. Fig. 5 is a sectional elevation of the same, taken through the line $y\,y$, Fig. 4.

To keep fish-plates tight to railroad-rails, so that their bearings shall be continuous, is a well-known trouble. Either the nuts of the bolts unscrew, or if the arrangement of the joints be such that metal is brought solidly to metal, heat and cold or sudden jars will soon work an insensible looseness which will increase with wear, and the upper surface of the rail become out of line, and injury and expense result from the ties to the driving-wheels of the locomotive. To avoid these difficulties, and make a tight bearing-joint that will give and take and remain with a uniform bearing of the fish-plates against the rails during the life of the rails, is the object of this invention.

The invention, in part, consists in the use of the spring metallic washer made with a rivet or bolt hole in its center, curved in the form of a section of a hollow cylinder, and with the greatest thickness of metal opposite the rivet or bolt hole in the line of the length of the cylinder of which the washer forms a part, and diminishing gradually toward the bearing-edges, whereby a uniform elasticity will be given to all parts of the washer.

I do not confine myself to any particular form of spring-washer, but design to include any form of spring-washer or spring that will answer the purpose; still I prefer this form as being the cheapest to make and the best for use.

The invention mainly consists in the combination of the metallic spring-washers with the rails, fish-plates, and bolts or rivets having, while in action, two immovable heads, each in such a manner that the washers will give and take to all strains, and maintain a uniform rigid working condition during the life of the rail, as will be hereinafter fully described.

I use in this construction two fish-plates, the ends of two rails making the joint, and two bolts, one on each end of the rails, and one washer to each bolt. Four bolts and four washers may be used for each joint, two to each end of the rails. The two bolts I use may be more economical, and, if properly constructed, will answer the purpose; but double this—namely, four bolts—will be safer, and probably the best in the long run.

A represents a railroad-rail. B are the fish-plates.

C is the washer, and D is the rivet or bolt which is to receive an immovable head at the finish.

I do not confine myself to the particular form of fish-plate shown upon the drawings, which can be varied according to circumstances. Any of them must have bolt or rivet holes punched in them.

There are several ways of making the tip end of the bolt a substantial rivet-head. It can be done by riveting the end of the bolt down directly upon the fish-plate after the washer has been sprung down, so as to touch, or nearly so, the opposite fish-plate; or the bolt may be made with nut and screw, and if the strength of the washer does not prevent the nut from unscrewing, to make an immovable head to the bolt of the nut. The cold chisel or other appliance must be used to destroy the continuity of the thread of the bolt and nut, or the tip of the bolt must be riveted down upon the nut.

The ends of the rails must be perforated to receive the bolts or rivets.

The washers can be made of any elastic metal, but are preferably made of steel tempered, and are to slide free upon the fish-plates at both end edges. The washers are made in the form of sections of a hollow cylinder, have a hole through their centers to receive the rivets or bolts, and may be of any suitable form; but I prefer to make them square.

In using my improvement, the fish-plates B of any form are arranged in place upon the opposite sides of the web of the rails A, and the rivet-bolts D are passed through the holes in the washers C, and then through the holes in the web and corresponding holes through the fish-plates, as shown, for one bolt and washer in Fig. 1. A pressure sufficient to straighten the washer C against the adjacent fish-plate B is then applied with some suitable instrument to the head of the rivets D, and the forward ends of the said rivets are headed down upon the fish-plate B at that side of the rail, as shown in Figs. 2 and 3.

In case the nut and screw-bolt be used instead of the plain rivet, the immovable riveted head is made substantially as heretofore described.

With this construction any wear or expansion or contraction from heat and cold will be taken up by the elasticity of the washers, and the joint will be held firm and rigid during the life of the rails.

What I claim as new is—

A give-and-take railroad-rail joint consisting of the following elements in combination—namely: two rails with proper holes in the webs at the ends thereof, two fish-plates with corresponding holes in them, two bolts each with two immovable heads while in action, and two metallic spring-washers with holes in them, substantially in the manner and for the purposes herein described.

THOMAS A. DAVIES.

Witnesses:
JAMES T. GRAHAM,
EDWARD M. CLARK.